Feb. 27, 1951 L. W. FEAGIN 2,543,450
CONTROL STICK
Filed May 13, 1947 2 Sheets-Sheet 1

Inventor
Luther W. Feagin,

By McMorrow, Berman & Davidson
Attorneys

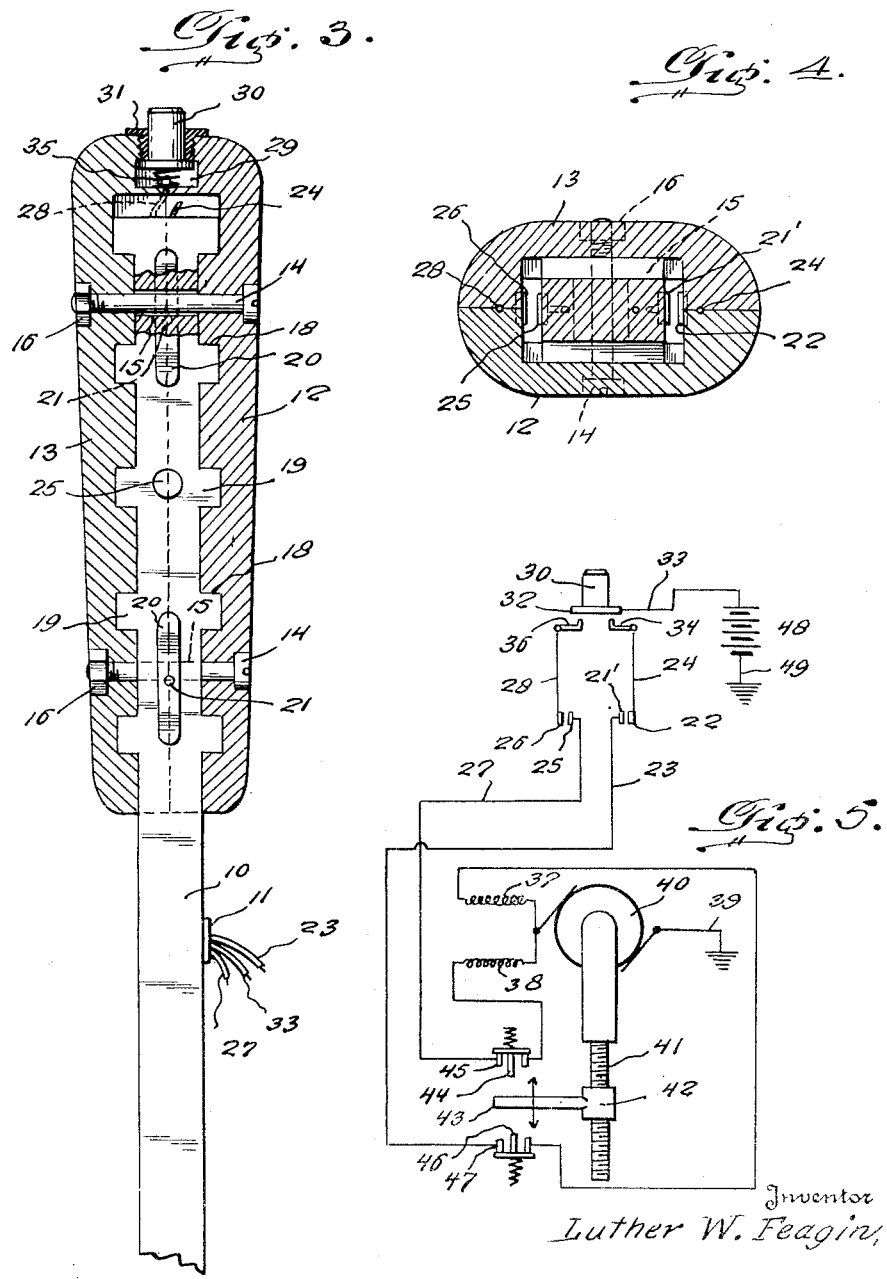

Patented Feb. 27, 1951

2,543,450

UNITED STATES PATENT OFFICE 2,543,450

CONTROL STICK

Luther W. Feagin, Long Beach, Calif.

Application May 13, 1947, Serial No. 747,609

3 Claims. (Cl. 74—470)

This invention relates to a trim control combined with the control stick for aircraft.

In modern aircraft, the trim tabs are rearward extensions of the control airfoils and are pivotally mounted on the latter for independent movement with respect to same. Various controls for these trim tabs have heretofore been devised, but none of same has been found fully satisfactory. In the case of electric motors for operating the trim tabs, it usually develops that no matter for how short a time the pilot holds the trim tab switch in the closed position, it always develops that he has held it too long, and the aircraft is "over-trimmed."

The object of the present invention is to incorporate the switch for controlling the trim tab-operating motor in the control stick for the aircraft.

Another object of the present invention is to provide a unitary construction of a control stick and the control switch for the trim tab-operating motor so that the motor will cease operation when the pressure on the control stick is released.

An additional object of the present invention is to provide a unitary construction of the control stick and the control switch for the trim tab-operating motor through which the trim tab may be operated from the switch and motor to provide an elevator booster, for instance, during combat maneuvers.

A further object of the present invention is to provide a unitary construction of the control stick and the control switch for the trim tab-operating motor whereby the trim tab may be used as an aid in all flight maneuvers.

A still further object of the present invention is to provide a unitary construction of the control stick and the control switch for the trim tab-operating motor whereby the pilot may operate the motor without removing his hand from the control stick for trimming the aircraft during landing.

Additional objects, advantages, and improvements will become apparent from the following specification, taken in connection with the accompanying drawings, in which:

Figure 3 is a sectional view through the control stick and control switch, this view being taken at right angles to that of Figure 2.

Figure 4 is a sectional view on the section line 4—4 of Figure 2, showing the switches for partially completing the circuits of the trim tab-operating motor when the control stick is moved either forward or rearward.

Figure 5 is a circuit diagram showing the operating circuit of the trim tab-operating motor and the drive for operating the limit switches from the latter.

Figure 1:
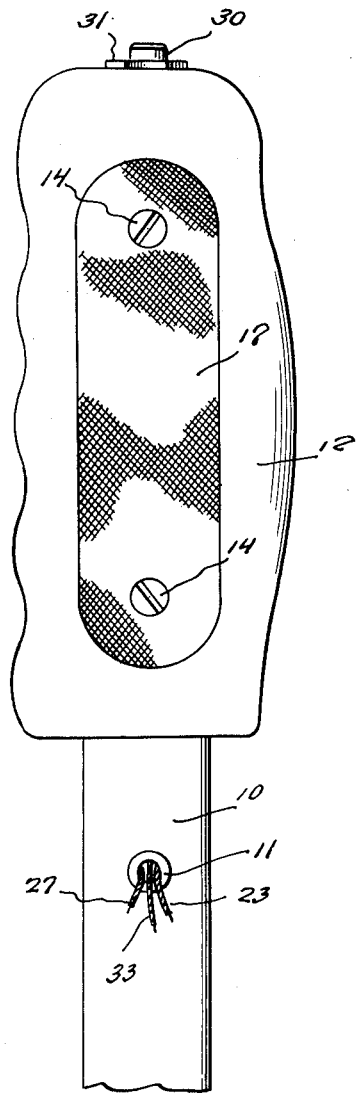
Figure 1 is an end elevational view of a control stick incorporating a control switch for the trim tab-operating motor according to the present invention.
Figure 2:
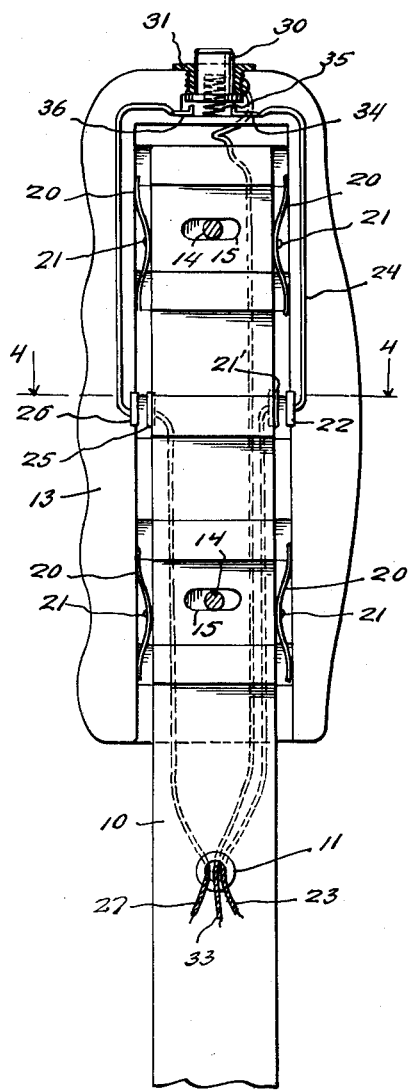
Figure 2 is a sectional view through the control stick and control switch.

Referring now to the drawings in detail, and to Figure 3 in particular, the control stick is here shown at 10. This control stick is of hollow or tubular construction, and has a grommet 11 through which three conductors 23, 27, and 33 extend. Over the upper end of the control stick 10 there is placed a loose hand grip of longitudinally split construction and comprised of two sections 12 and 13. The hand grip may be made of hard rubber or any similar suitable material. The two grip sections 12 and 13 of the hand grip are held together by bolts 14 extending through aligned holes in the sections and having their heads fitted in suitable counterbores in the grip section 12 and nuts 16 on their ends fitted in suitable counterbores in the grip section 13. The bolts 14 pass through holes 15 in the control stick 10, these holes being elongated in the direction of oscillation of the control stick. On their sides the grip sections 12 and 13 are provided with elongated knurled areas 17 (Figure 1) which have rounded ends concentric with respect to the bolts 14.

The grip sections 12 and 13 are provided on their interiors with a plurality of vertically spaced annular grooves 18, each of which receives an annular rib 19 on the control stick 10, this construction preventing any longitudinal movement of the grip sections with respect to the control stick. In order to provide uniform spacing of the grip sections with respect to the control stick 10 in the plane of oscillation of the latter, upper and lower half-elliptical leaf springs 20 are provided. These springs are secured to the control stick at their mid-sections by rivets 21 and have their ends abutting the inner surfaces of the grip sections.

A first switch is comprised of a contact plate 21' mounted on the control stick 10 in the plane of oscillation of the latter and cooperating with a contact plate 22 mounted on the inner surface of the grip sections 12 and 13. From the contact plate 21' a conductor 23 extends downwardly through the control stick 10 and out through the grommet 11; from the contact plate 22 a conductor 24 extends upwardly between the grip sections 12 and 13.

Similarly, a second switch is comprised of a contact plate 25 mounted on the control stick 10 diametrically opposite the contact plate 21', and also in a plane of oscillation of the control stick. The contact plate 25 cooperates with a contact plate 26 mounted on the inner surfaces of the grip sections 12 and 13. From the contact plate 25 a conductor 27 extends downwardly through the control stick 10 and out through the grommet 11; from the contact plate 26 a conductor 28 extends upwardly between the grip sections 12 and 13.

A third switch is mounted in the tops of the grip sections 12 and 13, being received in a suitable bore 29 therein. This switch is comprised principally of a button 30, preferably of suitable insulating material, such as "Bakelite," which is mounted for reciprocation in a bushing 31 screw-threaded in the bore 29. This button 30 carries a contact disc 32 on its under face, and from this disc a conductor 33 extends downwardly through the control stick 10 and out through the grommet 11. A coil compression spring 35 is seated in the bottom of the bore 29 and received at its top in a suitable bore in the button 30. The fixed contacts of this switch are comprised of two prongs 34 and 36 embedded in the grip sections 12 and 13 at the bottom of the bore 29. The conductor 24 is connected to the prong 34, and the conductor 28 to the prong 36.

The trim tab (not shown) is operated by the electric motor 40, the circuit for this motor being shown in Figure 5. For a complete description of the mechanical connections between this motor and the trim tab, reference may be had to U. S. Patent No. 2,379,999 to W. Tydon et al., issued July 10, 1945, for "Control Operating Mechanism." This motor has two series fields 37 and 38 which are wound in opposite directions, and each connected at one end to the armature; the other side of the armature is grounded at 39. The motor 40 operates the reduction gearing comprised of a screw 41 on which is mounted a traveler nut 42, the latter having an arm 43 thereon. The arm 43 at its upper limit of travel operates the plunger 44 of an upper limit switch 45, and at its lower limit of travel operates the plunger 46 of a lower limit switch 47. The conductor 23 is connected to the series field 37 through the lower limit switch 47, and the conductor 27 is connected to the series field 38 through the upper limit switch 45. The conductor 33 from the push-button 30 is connected to one terminal of a battery 48; the other terminal of the battery 48 is grounded at 49.

The operation of the semi-automatic trim control should be apparent from the preceding description. It may, however, be summarized as follows: If the control stick 10 is moved forward to nose down the aircraft, the grip sections 12—13 will be forced against the stick and the circuit of the trim tab-operating motor 40 will be partially completed to partially contact plates 21' and 22. If the push button 30 is now pressed, the circuit of the motor 40 will be completed at 32—34, and the motor will be operated to place nose-down trim on the aircraft. Similarly, if the control stick 10 is moved rearward to nose up the aircraft, the grip sections 12—13 will be forced against the control stick 10, and the circuit of the trim tab-operating motor 40 will be partially completed across the contact plates 25—26. If the push button 30 is now pressed, the circuit of the motor 40 will be completed at 32—36, and the motor will be operated to place nose-up trim on the aircraft. In either event, it will be apparent that operation of the trim tab motor 40 will cease almost instantaneously upon relaxation of the pressure on the control stick 10.

It will be understood that, while the above description and annexed drawings set forth the preferred embodiment of the invention, various changes may be made in the sizes, proportions, and relative arrangement of the various parts without departing from the spirit of the invention as defined in the appended claims.

Having thus described my invention, what I claim as new and useful and desire to secure by Letters Patent of the United States is:

1. A control stick comprising a stick element adapted to be moved in opposite directions in substantially the same plane, a handle loosely mounted on said stick element, said handle being formed with a bore loosely receiving said stick element, said bore defining an interior sidewall in said handle, portions of said sidewall being spaced from opposite sides of said stick element whereby said handle can be moved sidewise relative to said stick element in opposite directions by manual force exerted upon said handle, expanding spring means mounted on opposite sides of said stick element and positioned in the spaces between said sidewall portions and the related sides of said stick element whereby said handle normally occupies an intermediate position on said stick element, and guide means comprising transversely extending portions on said stick element and transversely extending portions on said handle sidewall portions, said transversely extending portions being interengaged to permit free sidewise movement of said handle relative to the stick element in either direction while precluding longitudinal movement of said handle relative to said stick element in either direction.

2. A control stick comprising a stick element adapted to be moved in opposite directions in substantially the same plane, a handle loosely mounted on said stick element, said handle being formed with a bore loosely receiving said stick element, said bore defining an interior sidewall in said handle, portions of said sidewall being spaced from opposite sides of said stick element whereby said handle can be moved sidewise relative to said stick element in opposite directions by manual force exerted upon said handle, expanding spring means mounted on opposite sides of said stick element and positioned in the spaces between said sidewall portions and the related sides of said stick element whereby said handle normally occupies an intermediate position on said stick element, and guide means comprising transversely extending portions on said stick element and transversely extending portions on said handle sidewall portions, said transversely extending portions being interengaged to permit free sidewise movement of said handle relative to the stick element in either direction while precluding longitudinal movement of said handle relative to said stick element in either direction, said guide portions comprising slidably engaged ribs and grooves.

3. A control stick comprising a stick element adapted to be moved in opposite directions in substantially the same plane, a handle loosely mounted on said stick element, said handle being formed with a bore loosely receiving said stick element, said bore defining an interior sidewall in said handle, portions of said sidewall being spaced from opposite sides of said stick element whereby said handle can be moved sidewise relative to said stick element in opposite directions by manual force exerted upon said handle, expanding spring means mounted on opposite sides of said stick element and positioned in the spaces between said sidewall portions and the related sides of said stick element whereby said handle normally occupies an intermediate position on said stick element, and guide means comprising transversely extending portions on said stick element and transversely extending portions on said handle sidewall portions, said transversely extending portions being interengaged to permit free sidewise movement of said handle relative to the stick element in either direction while precluding longitudinal movement of said handle relative to said stick element in either direction, said stick element having transverse ribs projecting therefrom and slidably engaging in transverse grooves formed in the handle sidewall portions and constituting said transversely extending portions.

LUTHER W. FEAGIN.

REFERENCES CITED

The following references are of record in the file of this patent:

UNITED STATES PATENTS

| Number | Name | Date |
|---|---|---|
| 1,810,159 | Carol | June 16, 1931 |
| 1,911,444 | Fator | May 30, 1933 |
| 2,041,704 | Gordon et al. | May 26, 1936 |
| 2,358,363 | Truesdell | Sept. 19, 1944 |
| 2,390,846 | Obszarny | Dec. 11, 1945 |
| 2,393,892 | De Ganahl | Jan. 29, 1946 |
| 2,450,597 | Karnowski | Oct. 5, 1948 |